Feb. 13, 1968 R. L. STAUFFER ET AL 3,369,238

VOR RECEIVER WITH SELF-CALIBRATION TO ELIMINATE BEARING ERRORS

Filed Feb. 14, 1967 2 Sheets-Sheet 1

REUBEN LAVERNE STAUFFER
LESTER R. YATES
INVENTORS

BY Bruce L. Lamb

ATTORNEY

Feb. 13, 1968 R. L. STAUFFER ET AL 3,369,238

VOR RECEIVER WITH SELF-CALIBRATION TO ELIMINATE BEARING ERRORS

Filed Feb. 14, 1967 2 Sheets-Sheet 2

United States Patent Office 3,369,238
Patented Feb. 13, 1968

1 2

3,369,238
VOR RECEIVER WITH SELF-CALIBRATION TO ELIMINATE BEARING ERRORS
Reuben L. Stauffer, and Lester R. Yates, Baltimore, Md., assignors to The Bendix Corporation, Baltimore, Md., a corporation of Delaware
Filed Feb. 14, 1967, Ser. No. 616,066
16 Claims. (Cl. 343—106)

ABSTRACT OF THE DISCLOSURE

A VOR navigation receiver having automatic calibration means eliminating errors due to differential phase shift in the receiver phase comparison circuits. An electrically variable phase shifter is inserted in one of two separate signal circuits. Identical signal is applied to both signal circuits. Detected phase difference inversely controls phase shifter to eliminate phase difference.

The present invention relates to radio range receivers used as aircraft navigational aids. It is particularly adapted to the reception of VOR and similar transmissions where it serves to reduce errors in indicated bearings which have their source within the receiving equipment.

The airways of the United States and other countries are serviced by omnidirectional radio range stations which automatically provide suitably equipped aircraft with continuously indicated magnetic bearings to or from a particular station. This system, commonly called VOR (Visual Omnidirectional Range) to distinguish it from earlier four-course ranges, transmits by means of a rotating directional antenna, a VHF carrier which is amplitude modulated by an audio frequency subcarrier. The directional antenna produces fluctuations in the strength of the signal received from it at a distant point. These fluctuations correspond in frequency to the scan rate of the antenna and produce maximum signal when the antenna beam is pointed directly at the receiver. Thus an amplitude modulated carrier wave is provided which contains information as to the relative bearing of a receiver from the transmitter. Before this information can be utilized, a reference is required and this is supplied to the receiver by the audio subcarrier which is frequency modulated at the same rate as the antenna scan. The receiver includes a filter for separating the low frequency, usually 30 c.p.s., audio signal on the detected carrier arising from antenna scan, and a band pass filter for separating the audio subcarrier from the detected carrier. The subcarrier frequency is centered, usually at 9960 c.p.s. from which it deviates ±480 c.p.s. at the 30 c.p.s. rate. The receiver also includes a limiter and an FM detector for recovering the 30 c.p.s. signal from the subcarrier.

The transmitter frequency modulator is synchronized with the antenna scan mechanism so that a maximum subcarrier frequency deviation will be produced when the antenna beam is pointing in the reference direction, usually magnetic north. Thus, an observer on a due north radial from the transmitter will discover this fact by comparing the phase of the 30 c.p.s. signal recovered directly from the receiver carrier with the 30 c.p.s. signal recovered indirectly from the received subcarrier and noting that the signals are in phase. As the observer moves around the station to an east radial, a 90 degree phase difference between the 30 c.p.s. signals is noted, and so on, so that the difference in electrical phase of the signals corresponds to the magnetic bearing of the observer. The 30 c.p.s. signal on the frequency modulated subcarrier and the 30 c.p.s. amplitude modulation signal have respectively become known as the reference phase and the variable phase signals. In present systems, the reference phase signal is applied to a resolver which serves as an electromechanical phase shifter. The resolver rotates the phase of the reference signal an amount equal to the rotary displacement of the resolver rotor. By applying the phase shifted output of the resolver and the variable phase signal to a phase detector and the output of the phase detector to a servo motor connected to the resolver rotor, the magnetic bearing of the receiver from the transmitter is automatically and continuously indicated.

The present invention is concerned with the reduction and elimination of errors in such a system. It is evident that errors in indicated bearing may arise due to differential phase shifts between the circuits in which the reference phase and variable phase signals are separately processed. Errors may also arise from unbalances or biases in portions of the servo system.

It is the principal object of this invention to provide means for recognizing and automatically correcting errors originating within mobile VOR navigation equipment. It should be recognized that the successful attainment of this object would not eliminate errors resulting from faulty transmitting equipment or from poor antenna sites, as such errors can be corrected only by operating on the transmitter.

It is a further object of the invention to provide a self-calibrating VOR navigational receiver providing a flag alarm output in the event that the errors in the receiver exceed a threshold of reasonable value.

Still another object of the invention is to provide a self-calibrating VOR navigational receiver with manual test means providing a visual indication of the amount of error in the system.

Briefly, the present invention comprises timing and switching means for calibrating a VOR navigational receiver by periodically applying an identical input signal to the separate reference and variable phase channels of the receiver. One of these channels, preferably the variable phase channel, includes a voltage controlled phase shifter. Means are provided for detecting the error signal present in the bearing indicator servo system and for applying the error detected during calibration to a storage circuit. The output of the storage circuit is applied inversely to the phase shifter to cause the latter to introduce such phase shift as is needed to equalize differential phase shifts between the separate receiver channels.

Figures 1, 3:
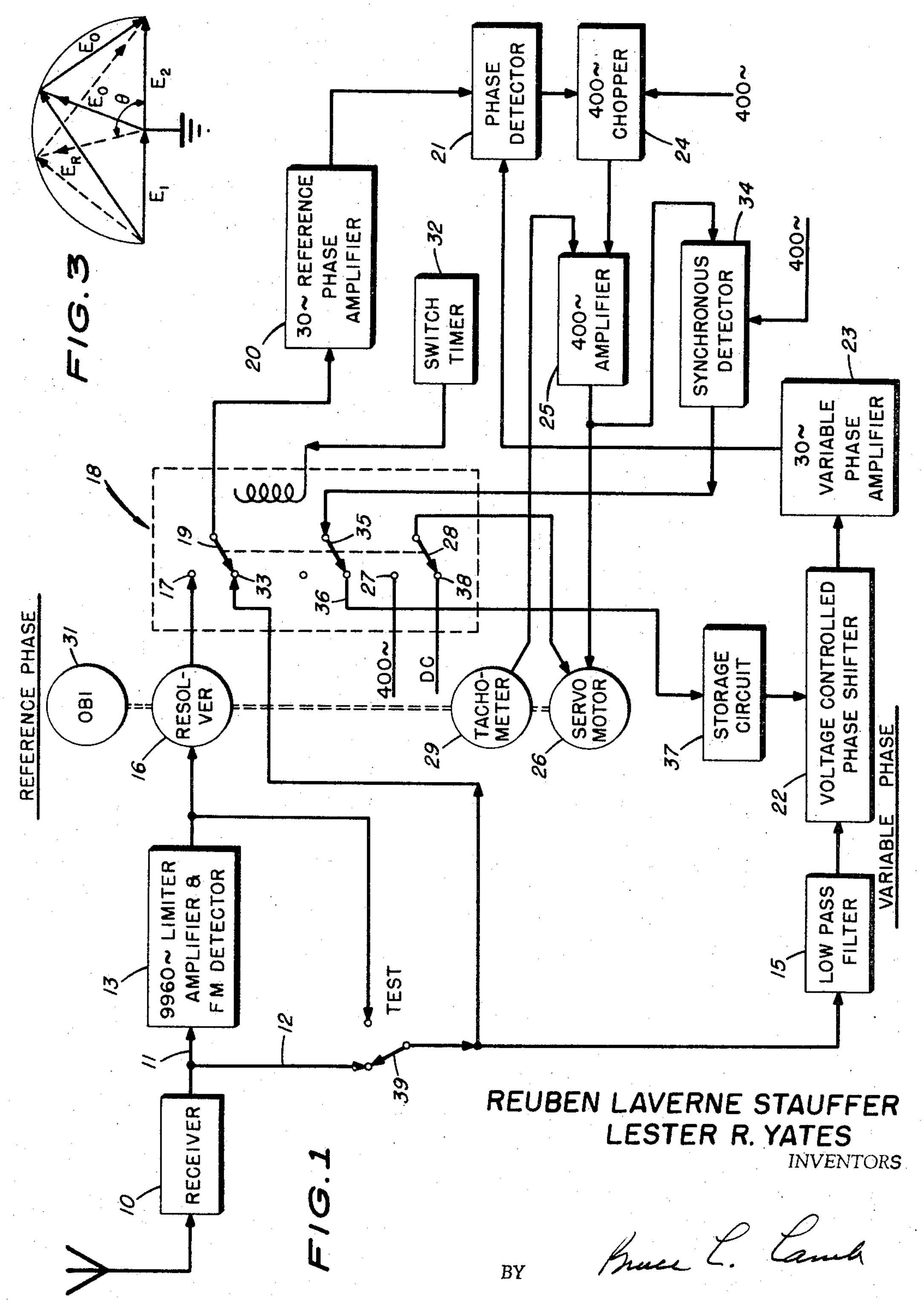
FIG. 1 is a functional block diagram of a VOR navigational receiver incorporating the invention.
FIG. 3 is a circle diagram illustrating the phase relationship of voltages in the voltage controlled phase shifting element of the invention.

Referring to FIG. 1, navigational signals are received in a conventional VHF superheterodyne receiver 10 tuned to the selected VOR transmitter. The output of the receiver is a spectrum of audio frequencies including a 30 c.p.s. variable phase signal originating from the amplitude modulation introduced by the transmitter antenna scan and a band of components having frequencies disposed about 9960 c.p.s. due to the frequency modulation of the transmitter subcarrier. This composite signal is applied through lead 11 to a limiter-amplifier-FM detector 13 operating in the subcarrier frequency band to produce at its output the 30 c.p.s. reference phase signal and, through lead 12, to a low pass filter 15 which rejects the higher frequency signal components to produce at its output the 30 c.p.s. variable phase signal. The reference phase signal passes through a phase shifting resolver 16 to contact 17 of a multicontact electromagnetic relay 18. Relay arm 19 normally engages contact 17 to supply the phase shifted reference signal, through amplifier 20, as one input to a phase detector 21. The 30 c.p.s. variable phase signal from filter 15 passes through a voltage controlled phase shifter 22, which for the moment, may be assumed to have no effect on the signal, through an amplifier 23 to phase detector 21. The output of phase detector 21 is a direct voltage proportional to the phase difference between the two applied signals. This direct voltage is converted into a 400 c.p.s. alternating voltage by a chopper 24 operated from a 400 c.p.s. source. The chopper output is amplified in a servo amplifier 25 and then excites the control field of a conventional two phase induction servo motor 26. The fixed field of motor 26 is excited from the 400 c.p.s. source through contact 27 and arm 28 of relay 18. A tachometer generator 29, the rotor of resolver 16 and an omnibearing indicator 31 are mechanically coupled to servomotor 26. Tachometer 29 provides rate feedback for stabilizing the servomechanism, while indicator 31 provides visual data on the position of the rotor of resolver 16, which, of course, is the desired bearing indication when the servo system is in equalibrium.

Thus far, the description has included, except for phase shifter 22, only those elements found in prior VOR navigational receivers. In operation the phase of the 30 c.p.s. reference signals is compared with the phase of the 30 c.p.s. variable signal in phase detector 21, producing an error signal which is modulated at 400 c.p.s. for controlling motor 26. Motor 26 drives resolver 16 to such a position that the phase shift introduced thereby in the reference signal is equal to the phase of the variable signal. The phase detector output will then be zero. This equilibrium position of the servomotor is dependent upon the bearing of the receiver from the range transmitter and this desired information may be read in degrees graduated upon the dial of indicator 31. If an undesired differential phase shift should exist between the separate reference and variable phase channels or if an undesired bias should exist in the 400 c.p.s. chopper 24 and amplifier 25, servomotor 26 will drive resolver 16 to an erroneous position. In accordance with the present invention, periodically at 5 second intervals, the receiver automatically enters a self-calibrate mode, during which the amount of error present in the normal operating mode is detected and used to control phase shifter 22 so that such errors will be eliminated from subsequent bearing indications. For this purpose a switch timer 32 periodically cycles relay 18. In the calibrate mode, arm 19 engages contact 33 which carries the 30 c.p.s. variable phase signal at the input to filter 15. The input to amplifier 20 is thus transferred from the reference phase signal to the variable phase signal, consequently, identically phased signals are applied to the separate phase comparison channels of the receiver. The output of servo amplifier 25, which is proportional to the output of phase detector 21 in magnitude, is reconverted to a direct voltage in synchronous detector 34, whence, through arms 35 and contact 36 of relay 18 it is integrated and retained in a storage circuit 37 and thereafter appears as the control voltage for phase shifter 22. If differential phase shift exists between the separate channels; for example, if the output of amplifier 20 leads the output of amplifier 23, phase detector 21 will produce an output, the magnitude of which is proportional to the phase difference and the polarity of which indicates the relative phase. Assuming that a leading voltage from amplifier 20 produces a positive output from phase detector 21, a control voltage of such polarity as to cause phase shifter 22 to introduce phase lead will be applied thereto. If the output of amplifier 20 lags the output of amplifier 23 during self-calibration, the output of phase detector 21 is of the opposite polarity producing a control voltage for phase shifter 22 of the opposite sense and causing phase shifter 22 to introduce a lagging phase shift. Thus differential phase shifts between the separate channels are equalized by introducing a phase shift in the variable phase channel equal to the difference. During the calibration operation just described, arm 28 of relay 18 engages contact 38 to apply direct current to the fixed field of servomotor 26. This locks motor 26 in the position held during the preceding normal operating cycle so that no change in the bearing indication occurs during calibration.

Figure 2:
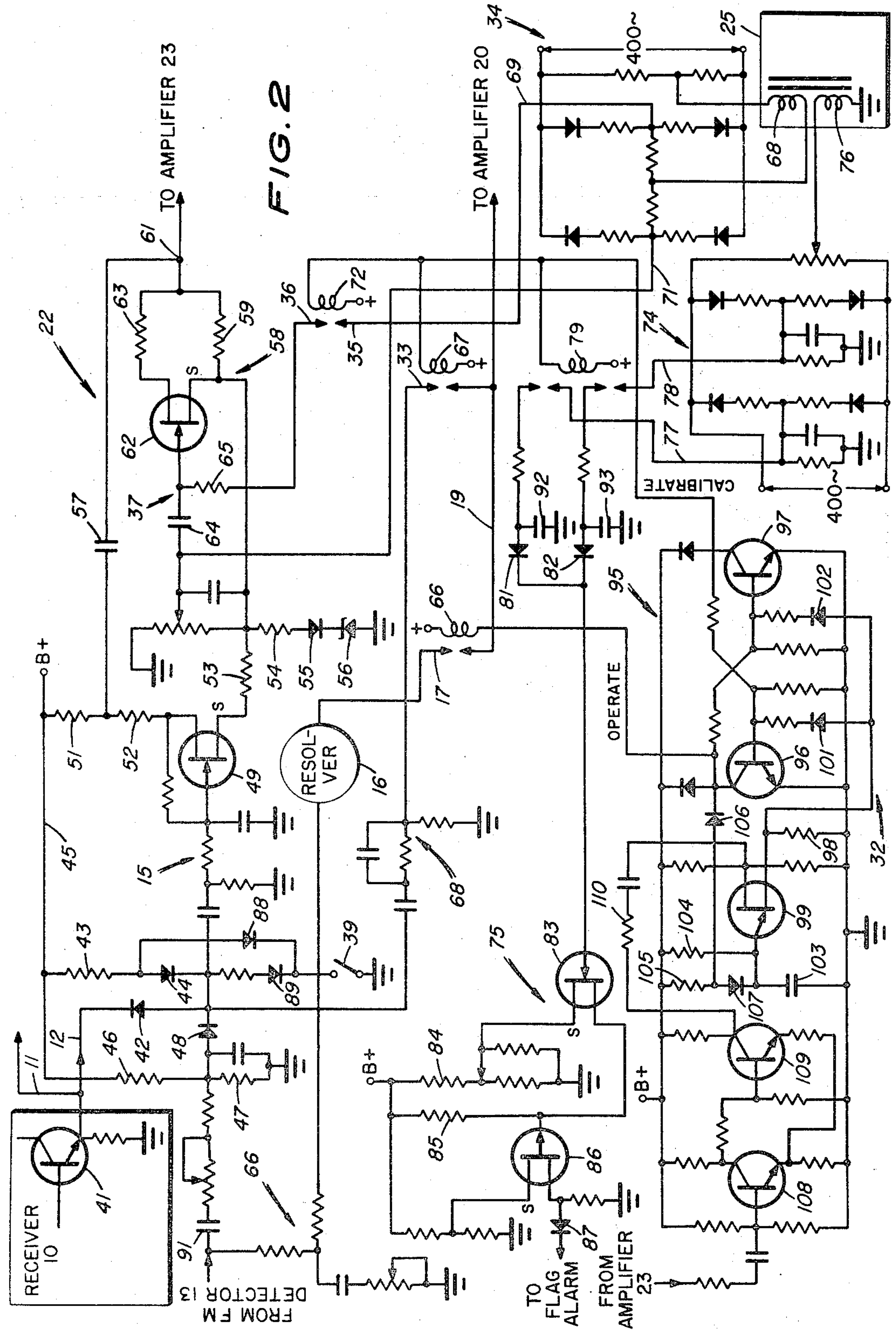
FIG. 2 is a schematic diagram illustrating details of the invention.

The receiver is tested manually by operating pushbutton switch 39 to disconnect the variable phase signal from the receiver output and apply instead the 30 c.p.s. reference phase signal to the variable phase channel. The system continues to operate in the normal mode with the result that the omnibearing indicator 31 should return to a zero degree bearing indication. If such an indication is not produced the operator is warned of fault in the system and, except in case of total breakdown, of the amount of error present. Details of the self-calibrating means of the invention appear in FIG. 2, to which reference is now made.

The output signal of receiver 10 containing both the subcarrier reference phase signal and the variable phase signal appears at the output of an emitter follower 41. A switching diode 42 is normally conductively biased through resistor 43 and diode 44 connected between the B+ line 45 and the anode of diode 42. Voltage dividing resistors 46 and 47 apply a positive potential to the anode of a switching diode 48 which is less in magnitude than the potential appearing at the cathode of diode 44. Consequently diode 48 is normally blocked. This permits signal to flow normally through lead 12 and diode 42 to the low pass RC filter network 15. Filter 15 removes the subcarrier signal output from the receiver signal and permits the 30 c.p.s. variable phase signal to pass to the gate of a field effect transistor 49. The drain electrode of transistor 49 is connected to B+ through resistors 51 and 52, while the source electrode is grounded through resistors 53, 54, diode 55 and zener diode 56, the latter serving as a regulated voltage source. Transistor 49 serves as a phase splitter providing oppositely phased signals of equal magnitude across resistors 52 and 53 relative to ground. A variable phase shift network comprising capacitor 57 and an electrically variable resistance arm 58 is connected to resistors 51 and 54. Resistance arm 58 includes a resistor 59 connected from resistor 53 to the junction 61 and a shunt path of variable conductance provided by a field effect transistor 62 and resistor 63. Conduction through transistor 62 is controlled by the voltage developed in storage circuit 37, comprised by capacitor 64 and resistor 65. As is evident, resistor 59 places a maximum limit and resistor 63 places a minimum limit on the resistance value which can be assumed by resistance arm 58. The circuits which include transistors 49 and 62 constitute the voltage controlled phase shifter 22 of FIG. 1, the operation of which will later be more fully described. It is sufficient for the moment to note that the signal appearing at junction 61 is a 30 c.p.s. signal, the phase of which may be varied relative to the signal from filter 15 without varying the magnitude thereof. This signal is applied to amplifier 23 for utilization in the manner described with reference to FIG. 1.

The 30 c.p.s. reference phase signal appearing at the output of the subcarrier FM detector 13 is conducted through a manually adjustable phase compensating network 66 and resolver 16 to contact 17 of a magnetic reed switch 66. One contact of reed switch 66 is connected to a contact of a second reed switch 67. Switches 66 and 67 are normally open but are operated in alternation from switch timer 32 so that together these switches constitute contacts 17, 33 and arm 19 of relay 18 shown schematically in FIG. 1. Switch 66 is closed during normal operation to conduct the reference phase signal through the common switch contacts 19 to amplifier 20 where it is utilized in the normal manner to determine range station bearings. During self-calibration, switch timer 32 causes switch 67 to close and switch 66 to open, thus applying the variable phase signal through a phase compensating network 68 and contact 33 to contact 19 whence it is utilized to provide a phase error signal from phase detector 21 indicative of the differential phase shift between the separate channels of the system. The phase error signal, modulated and amplified at 400 c.p.s., appears on a secondary winding 68 of the output transformer of amplifier 25. This winding is isolated from ground so that the output of synchronous detector 34 is a floating direct voltage present between lines 69 and 71. Line 69 is interrupted by a normally open magnetic reed switch 72 which is closed by switch timer 32 during the calibrate mode to apply control voltage to the storage circuit 37. Upon returning to the operating mode switch 72 opens and the long time constant of storage circuit 37 integrates and retains the average of the control voltages developed during previous calibrate mode operation.

Switch timer 32 must be synchronized with the 30 c.p.s. variable phase signal to provide stable operation of the calibration loop. The timer 32 includes in a multivibrator stage 95 transistors 96 and 97 the first of which, when conductive, energizes switch 66 for normal operation of the receiver. In the alternate state, conduction through transistor 97 energizes switches 67, 72 and 79 for self-calibration. Multivibrator 95 is triggered from one conductive state to the other by a relaxation type oscillator which develops a positive trigger pulse across a base resistor 98 of a unijunction transistor 99 whenever the transistor fires. These positive pulses are coupled to the bases of transistors 96 and 97 through diodes 101 and 102 to drive whichever transistor 96 of 97 is nonconductive into conduction and thereby initiate transition of the state of multivibrator 95.

The timing of multivibrator 95 is preferably asymmetrical causing transistor 96 to be conductive considerably longer than the conduction period of transistor 97. Typically, transistor 96 conducts for four sec. (normal operation) compared to a one sec. conduction period for transistor 97 (calibrate). For this purpose the timing circuit of the relaxation oscillator comprises a capacitor 103 with alternate charging paths comprising resistor 104 alone or the shunt combination of resistor 104 with resistor 105. Whenever transistor 96 is conductive, charging of capacitor 103 through resistor 105 is prevented by conduction through diode 106 which is then forward biased because of the low voltage at the collector of transistor 96, which also reverse biases diode 107. Transistor 96 remains conductive for a period determined by the time constant of the resistor 104-capacitor 103 combination. When capacitor 103 charges to the firing voltage of transistor 99, multivibrator 95 is triggered into its alternate state with transistor 97 conducting. The collector voltage of transistor 96 is then high, back biasing diode 106 and removing reverse bias from diode 107. The charging path for capacitor 103 is then through the parallel resistors 104 and 105 which suitably may have a total resistance equal to one-fourth the resistance of resistor 104 alone, thereby reducing the conduction period of transistor 97 to one-fourth that of transistor 96.

The switching of multivibrator 95 is synchronized with the 30 c.p.s. variable phase signal by shaping that signal in a squaring amplifier comprising transistors 108 and 109. The square wave output of the latter transistor is differentiated in a network 110 to provide a negative synchronizing pulse at the commencement of each negative half-cycle of the 30 c.p.s. variable phase signal. When capacitor 103 has charged nearly to the firing voltage of transistor 99, the synchronizing pulse from network 110 applied to the base of transistor 99, triggers transistor 99 and, in turn, multivibrator 95 causing the calibration mode of the equipment to begin and end with a constant phase relationship to the 30 c.p.s. variable phase signal. This action eliminates fluctuations in the control voltage for phase shifter 22 which would otherwise occur at a rate determined by the difference between the frequency of the variable phase signal and a significant harmonic of the frequency of switch timer 32.

The amount of phase shift which can be introduced by phase shifter 22 is limited. Under extraordinary conditions the differential phase shift between the separate channels of the system may be greater than the amount of correction obtainable from phase shifter 22. Phase shifter 22 could also fail to respond properly to control voltage or detector 34 could fail to develop proper control voltage. In such cases, it is desirable to provide a warning of the failure of the system to calibrate itself correctly. A separate synchronous detector 74 and alarm circuit 75 are provided. Input to detector 74 is from an additional secondary winding 76 on the output transformer of amplifier 25. Winding 76 is referenced to ground producing outputs on lines 77 and 78 from detector 74 which may be positive or negative depending upon the phase of the output of amplifier 25 with respect to the 400 c.p.s. source voltage. During the calibrate mode normally open magnetic reed switch 79 is closed thus applying the detected error voltages on line 77 and 78 stored in capacitors 92 and 93, to diodes 81 and 82. Diodes 81 and 82 are poled for the conduction of positive currents and consequently whichever of the capacitors 92 or 93 carries the more positive voltage will be effectively connected to the gate of a field effect transistor 83 while the voltage of the other capacitor is blocked. Diodes 81 and 82 thus provide the absolute value of the phase error voltage developed in detector 74. The source electrode of transistor 83 is connected to a positive bias source provided by potentiometer 84. This bias determines the threshold of the reliable operation of the calibration means. So long as the absolute value of the phase error signal from detector 74 is less than the source bias of transistor 83, the transistor gate is negatively biased and transistor 83 is nonconductive. As the voltage from diodes 81 or 82 approaches the bias voltage transistor 83 commences to conduct. The voltage across load resistor 85 then drops to a point where the gate electrode of a P-type field effect transistor reaches a level to permit conduction through the transistor thus providing a positive signal through diode 87 to trigger a system flag alarm and thereby warn the operator of failure of the equipment.

The operation of phase shifter 22 is best explained with the aid of the circle diagram of FIG. 3. Vectors $E_1$ and $E_2$ respectively, represents the voltages across load resistors 51 and 54 of the phase splitting transistor 49. The voltage across resistance arm 58 is represented by the vector $E_R$ and that across capacitor 57 is represented by the vector $E_C$. The latter two vectors are in quadrature and must add to equal the sum of voltages $E_1$ and $E_2$. The locus of these voltages is therefore a semicircle with diameter $E_1$ plus $E_2$. The output voltage is measured between ground and junction 61 and therefore appears in FIG. 3 as the radial voltage $E_0$. When the resistance of arm 58 is varied by changing the conductance of transistor 62; for example, when the resistance is reduced by increasing the transistor conductance, voltages $E_R$ and $E_C$ assume new values as shown by the dashed line vectors. The phase of the output voltage will then assume a new value $\theta$ relative to the input voltage.

Again referring to FIG. 2 the manual test means include switch 39 and diodes 88 and 89. It will be recalled that diode 42 is normally conductively biased through the forward current flowing from resistor 43 and diode 44 to the emitter of transistor 41. The anode of diode 48, being maintained at a lower potential than the anode of diode 42 is normally nonconductive. Thus when the system is operating normally signal flow is from the receiver through diode 42 and into the following phase shifter 22. When switch 39 is manually actuated to test the system the cathode of diode 88 is grounded, thereby grounding the anode of diode 44. This removes forward bias from diode 42 and blocks conduction therethrough at the same time eliminating reverse bias on diode 48. Now the signal path to the variable phase channel of the system is from the FM detector 13 through phase adjusting network 91 and conductively biased diode 48 to phase shifter 22 and following circuits. This connection simulates a variable phase signal having zero phase difference with the reference phase signal. As all the other elements of the system remain in normal operation, properly the servomotor should drive the omnibearing indicator to a zero degree indication. If this does not occur the operator is warned of failure of the system. If the omnibearing indicator is driven to within a few degrees of zero indication the operator may, at his discretion, continue to make use of the data from the system but with due note of the error involved.

Obviously many modifications and variations of the invention are possible in the light of the above teachings. It is therefore to be understood that, within the scope of the appended claims, the invention may be practiced otherwise than as specifically disclosed.

The invention claimed is:

1. In a navigational receiver for use with an omnidirectional radio range transmitter, said transmitter providing a reference signal and a variable signal which changes in phase relative to said reference signal in accordance with the bearing of said receiver from said transmitter,
   said receiver including means for separately recovering said transmitter reference and variable signals, a phase shifter for shifting the phase of one of said signals a variable amount relative to the other of said signals, means for comparing the phase of the other of said signals with said phase shifted signal, servo means controlled by said phase comparing means for controlling said phase shifter, and indicator means also controlled by said servo for presenting bearing information;
   automatic calibration apparatus comprising a second variable phase shifter for one of said signals,
   periodically operating switching means for simultaneously applying one of said signals to circuits preceding said phase comparing means, the output of which is then indicative of undesired phase shift in the receiver, and
   means operated by said switching means for applying a control signal from said servo to said second phase shifter in such sense as to reduce said servo control signal.

2. Apparatus as claimed in claim 1 wherein said switching means is synchronized with said signal applied by said switching means.

3. Apparatus as claimed in claim 2 with additionally, alarm means responding whenever said control signal exceeds a desired threshold.

4. The apparatus of claim 1, further defined by the production at the output of said phase comparing means of a direct voltage, a source of alternating voltage for powering said servo, and modulating means synchronized with said alternating voltage source for converting direct voltage from said phase comparing means into alternating control voltage for said servo and wherein said means operated by said switching means includes a detector synchronized with said alternating voltage source for converting said alternating servo control voltage into a direct voltage for controlling said second phase shifter.

5. Apparatus as claimed in claim 4 with additionally, means for disabling said servo indicator means during operating periods of said switching means.

6. Apparatus as claimed in claim 4 wherein said means operated by said switching means includes storage means receiving said converted servo control voltage during operating periods of said switching means, the voltage stored therein maintaining control of said second phase shifter during non-operating periods of said switching means.

7. Apparatus as claimed in claim 6 wherein said switching means are synchronized with said one signal switched thereby.

8. In an omnidirectional radio range receiver having means for recovering a first reference signal and a second signal which varies in accordance with the bearing of the receiver from a range transmitter, separate channels for processing said signals, means for comparing the phase of said separately processed signals, and means responsive to said phase comparison means for indicating the bearing of the receiver from the transmitter; automatic calibration means comprising,
   switching means for periodically switching said receiver into a calibration mode in which one of said signals is removed from its respective channel and the other of said signals is substituted therefor;
   phase comparing means for determining the phase difference between the outputs of said separate channels during calibration;
   phase shift means in one of said channels controlled by said phase comparing means to reduce the difference in phase shift between said separate channels; and,
   storage means to which the output of said phase comparing means is applied during calibration, said storage means providing continuous control for said phase shift means.

9. Apparatus as claimed in claim 8 wherein said switching means is synchronized with the signal utilized during calibration.

10. Apparatus as claimed in claim 9 with additionally, alarm means operable whenever the input to said storage means exceeds a threshold of allowable error.

11. In a navigation receiver for use with an omnidirectional radio range transmitter which radiates a carrier having a reference signal impressed thereon by means of a frequency modulated sub-carrier and a variable signal by means of amplitude modulation by a scanning directional antenna,
   said receiver including means for detecting and separately processing said transmitter reference and variable signals, means for comparing the phase of said reference and variable signals to provide a phase error voltage, a phase shifter for one of said signals, servo means coupled to said phase shifter and responsive to said phase error voltage to cause said phase shifter to null said phase error voltage and bearing indicator means also coupled to said servo means,
   automatic calibration apparatus comprising a voltage controlled phase shifter for introducing relative phase shift between said received reference and variable signals prior to phase comparison thereof,
   timing means periodically switching said receiver between a normal operating mode and a calibration mode, said receiver functioning in said normal mode to provide bearing indications by comparing the phase of said reference and variable signals, and in said calibration mode to remove one of said signals and substitute the other therefor whereupon said phase error voltage is indicative of differential phase shift in said receiver,
   means operative during said calibration mode for detecting said phase error voltage; and
   storage means continuously in control of said voltage variable phase shifter and operative during said calibration mode to receive and store said detected phase error voltage, said storage means controlling said voltage variable phase shifter in such sense as to null said phase error voltage present during said calibration mode.

12. Apparatus as claimed in claim 11 wherein said voltage variable phase shifter includes a phase splitting circuit providing equal and oppositely phased components of an input signal, a capacitive circuit, and a circuit of variable conductance connected in series, one of said components from said phase splitter being applied to said capacitive circuit, the other of said components being applied to said variable conductance circuit and the output of said phase shifter being taken at the junction of said capacitive and variable conductance circuits.

13. Apparatus as claimed in claim 12 wherein said variable conductance circuit includes a field effect transistor, the conductance of which is controlled by said storage means.

14. Apparatus as claimed in claim 12 wherein said timing means is synchronized with said other signal utilized in said calibration mode.

15. Apparatus as claimed in claim 14 wherein said switching means includes a dual time constant timing circuit arranged to provide an operating mode period greater than the period of the calibration mode.

16. Apparatus as claimed in claim 15 wherein the period of said calibration mode is substantially greater than the period of said variable signal.

References Cited

UNITED STATES PATENTS

| | | | |
|---|---|---|---|
| 2,912,688 | 11/1959 | De Faymoreau et al. | 343—106 |
| 3,312,972 | 4/1967 | Alitz | 343—106 |

FOREIGN PATENTS

| | | |
|---|---|---|
| 736,281 | 9/1955 | Great Britain. |

RODNEY D. BENNETT, *Primary Examiner.*

H. C. WAMSLEY, *Assistant Examiner.*